United States Patent [19]
Croiset et al.

[11] Patent Number: 5,597,281
[45] Date of Patent: Jan. 28, 1997

[54] DEVICE FOR HANDLING LOADS FROM A VEHICLE

[75] Inventors: Christian Croiset, St Etienne; Michel Robert, Villars, both of France

[73] Assignee: Marrel Société Anonyme, Andrezieux Boutheon, France

[21] Appl. No.: 318,998

[22] Filed: Oct. 6, 1994

[30] Foreign Application Priority Data

Oct. 7, 1993 [FR] France .................... 93 12139

[51] Int. Cl.⁶ ........................................ B60P 1/48
[52] U.S. Cl. .................. 414/498; 414/491; 414/546; 414/555
[58] Field of Search .................... 414/491, 498, 414/546–547, 555

[56] References Cited

U.S. PATENT DOCUMENTS

| | | | |
|---|---|---|---|
| 3,942,664 | 3/1976 | LeMaire | 414/498 X |
| 4,053,074 | 10/1977 | LeMaire | 414/491 |
| 4,204,793 | 5/1980 | LeMaire | 414/491 X |
| 4,225,281 | 9/1980 | Bibeau et al. | 414/498 |
| 4,344,731 | 8/1982 | Visa et al. | 414/491 X |
| 4,652,201 | 3/1987 | Boughton | 414/546 X |
| 4,755,098 | 7/1988 | Wulf et al. | 414/491 X |
| 5,108,247 | 4/1992 | Vlaanderen | 414/498 X |
| 5,290,138 | 3/1994 | Smart et al. | 414/498 X |

FOREIGN PATENT DOCUMENTS

| | | | |
|---|---|---|---|
| 2288014 | 5/1976 | France . | |
| 2294064 | 7/1976 | France | 414/491 |
| 2342183 | 9/1977 | France . | |
| 2385557 | 10/1978 | France . | |
| 2609011 | 7/1988 | France . | |
| 2617448 | 1/1989 | France | 414/547 |
| 1382691 | 3/1988 | U.S.S.R. | 414/491 |

*Primary Examiner*—James W. Keenan
*Attorney, Agent, or Firm*—Keck, Mahin & Cate

[57] ABSTRACT

The invention concerns an improved device for handling loads from a vehicle designed to be fitted on the loading platform of the vehicle, consisting of: one front section hinged on a rear section by a first pin, the rear section being hinged by a second pin on a sub-frame; one upper arm having a hook for gripping loads, at least one jack tilting in particular the front section around the first pin, the jack being linked in rotation by its rear end to the front section and by its front end to the sub-frame, and the device being characterized in that it has a temporary support on the sub-frame, in particular at the rear end of the jack, to establish at least a temporary force of reaction of the sub-frame on the rear end of the jack, at least during part of the movement of the rear section and in that the support consists of a sliding or running surface which defines part of the trajectory in particular of the rear end of the jack when the support is in action.

10 Claims, 6 Drawing Sheets

DEVICE FOR HANDLING LOADS FROM A VEHICLE

FIELD OF THE INVENTION

This invention relates to devices and appliances with hydraulic arms for handling loads such as cases, cradles, containers, skips, etc. from a vehicle, the devices or appliances in question being mounted on the vehicle's loading platform.

DESCRIPTION OF THE RELATED ART

This type of device is already known. French Patent No. 2,185,520, in the name of the applicant, shows us an appliance having a lower arm hinged approximately in the middle, supporting the load during transport on the vehicle, a front section of which, controlled by a jack hinge on the platform and positioned on it, has an upper support arm which grips the load for unloading or loading on the vehicle. The rear section of the lower arm is hinged on the back of the platform and the device has in particular a stop or knuckle joint making it possible to support the front section on the rear section during an unloading maneuver thus priming movement of the rear section.

This device gives very good results, but the hinge pin of the jack on the front section of the lower arm describes, during a loading or unloading cycle, a trajectory having a cusp at the point when the transfer of the axis of rotation of the lower hinged arm takes place, in other words from the axis of rotation of the front section on the rear section of the axis of rotation of the rear section on the platform or vice-versa. The part of the trajectory of the hinge pin of the jack on the front section, regarding the rotation of the latter around its hinge pin on the rear section near the cusp, leads to a very considerable reduction of the lever arm of the jack and thus a proportional increase of the thrust which it must supply.

The timed thrust at the trajectory point defining the minimum lever arm, represents the maximum thrust which the jack must supply during an unloading or loading manoeuvre, and leads in particular to over-dimensioning of the jack, and a consequent reinforcement of the elements of the structure of the device.

SUMMARY OF THE INVENTION

This invention makes it possible to avoid this disadvantage and to provide other advantages. More precisely, it consists of an improved device for handling loads from a vehicle, designed to be mounted on the loading platform of the vehicle, and consisting of at least:

one lower hinged arm including one front section hinged on one rear section by an initial hinge pin, the said first hinge pin being situated at a first end of the said front section, the said rear section being hinged by a second hinge pin on the said platform, one upper arm linked by its lower part to a second end of the said front section, and having at the upper part a means of gripping loads, at least one jack tilting the said lower arm around the said second hinge pin and/or the said front section around the said first hinge pin, the said jack being connected rotating round a third hinge pin by its rear end to the said front section, its front end being hinged to the said platform around a fourth hinge pin, the said third hinge pin being positioned between the said first hinge pin and the said second end of the said front section.

This device being characterized in that it includes the means of providing temporary support on the said platform, for one at least of the said front section or the said rear end of the jack or the third hinge pin, positioned between the said first hinge pin and the said second end of the said front section, or the said rear of the jack, or the said third hinge pin, at least during part of the movement of the said rear section, and in that these means of support consist of a sliding or running surface which defines one part of trajectory at least of the said front section or the said rear end of the jack, or the said third hinge pin when the said means of support are in action.

The force of reaction of the platform, which is established by the means of support during the period of movement when the thrust which the jack must supply is much greater, thus makes it possible to reduce the intensity of this thrust and consequently to reduce, in particular, the dimensions of the jack. The means of support also make it possible to avoid, in particular in relation to the device under Patent No. 2,185,520, the part of trajectory of the hinge pin of the jack on the front section, regarding the rotation of the latter around its hinge pin on the rear section near the cusp and responsible for the shorter lever arm of the jack.

The sliding or running surface makes it possible to guarantee in particular, according to its shape, the shape of the trajectory for example of the third hinge pin during the action of the means of support.

In this case, the temporary means of support cease to act when the front section is stopped on the rear section, in the case of unloading for example.

It will be noted that the device according to the invention makes it possible to avoid the use of this stop if wished. In fact, the means of support can act on the trajectory until the jack is fully extended, the movement of the front section and the rear section respectively around the first and second hinge pins being thus dependent on the means of support.

According to another advantageous characteristic, the said temporary means of support consist of at least a wheel and/or a bearing and/or a free section rotating around a fifth hinge pin, and supported on the said running surface, and according to another advantageous characteristic, the said means of temporary support consist of at least one block or prop supported on the said sliding surface.

These characteristics permit the selection of method of support, by running or sliding, according to need, in particular according to the load, the clearance required, the form of trajectory required of the third hinge pin or the duration of action of the methods of support.

Other advantages and characteristics will appear on reading the description accompanied by the annexed drawings which illustrate several examples of the method of execution of an improved device for handling loads from a vehicle of the lorry type according to the invention; the examples are given as an illustration and no restrictive interpretation of the protection sought can be drawn from this.

DETAILED DESCRIPTION OF THE INVENTION

Figure 1:
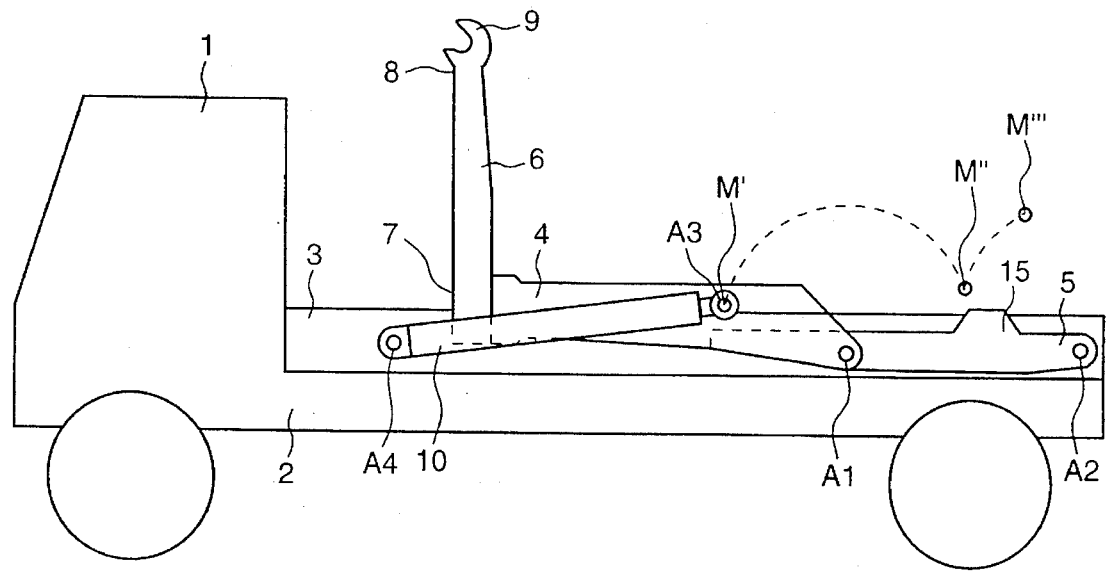
FIG. 1 represents in profile an example of the method of execution of a device of the previous type for the handling of loads from a vehicle, with the trajectory of its third hinge pin.

The device of the previous type illustrated by FIG. 1 for handling loads from the vehicle 1 of lorry type, designed to be mounted on loading platform 2 of the said vehicle, consists advantageously of a subframe 3 linked rigidly to platform 2, a hinged lower arm including a front section 4 hinged in rotation on a rear section 5 by a first hinge pin A1 transverse, the said rear section being hinged in rotation by a second hinge pin A2 transverse on subframe 3, an upper arm 6 linked by its lower part 7 to front section 4, advantageously telescopic in the latter or rotating in relation to the latter, having at the upper part 8 a hook 9 for gripping the load, at least one tilt arm 10 of the lower arm around the second hinge pin A2, and of front section 4 around the first hinge pin A1. The jack 10 is linked rotating around a third hinge pin A3 transverse by its rear end of the front section 4, its front end being linked to the subframe 3 around a fourth hinge pin A4 transverse. Rear section 5 of the lower arm has advantageously a stop 15, stopping the rotation of the front section 4 around the first hinge pin A1.

On FIG. 1, the curve linking points M', M", M"', defines the trajectory of the third pin A3 on a loading or unloading manoeuvre.

In an unloading manoeuvre, when the load (not shown) is on lorry 1 supported on hook 9, the jack has its rod retracted, and the third pin A3 is in the position M' shown in FIG. 1, jack 10 is activated. The front section 4 primes a rotation around the first hinge pin A1 until it is supported on stop 15, a moment represented by point M" of the trajectory, this stopping causes a change of axis of rotation of the lower arm and a move to rotation of the rear section 5 around the second hinge pin A1, under the continuous thrust of jack 10. Once the load is deposited on the ground, the third pin A3 being in position M'" on FIG. 1, the loading manoeuvre takes place in the reverse order of movements described for the unloading.

A cusp is noted in the trajectory of third pin A3 on the change of the hinge pin from the first pin A1 to the second pin A2, or vice versa, in other words at point M" shown in FIG. 1. The part of the trajectory M'-M" near point M" drives a minimum lever arm of the jack in relation to pin A1, and thus a maximum thrust by this.

Figure 2:
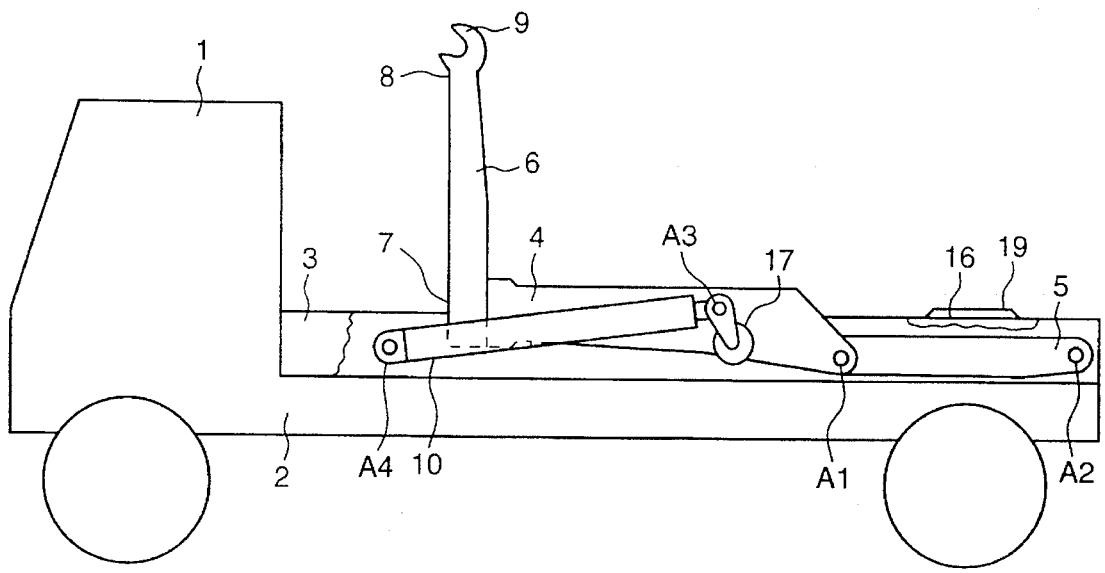
FIG. 2 represents in profile a first example of the method of execution of an improved device according to the invention for handling loads from a vehicle, mounted on a lorry, in transport position.
Figure 6:
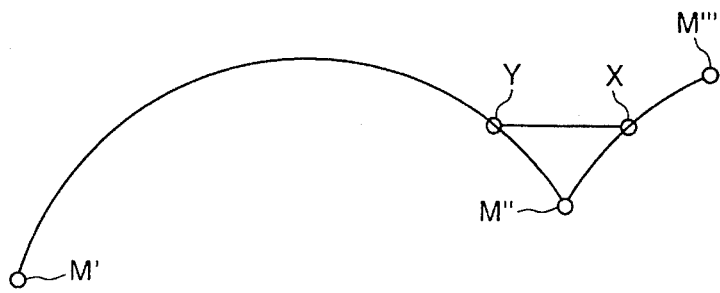
FIG. 6 represents in profile the compared trajectories of the third hinge pin for the device in FIG. 1 and for the improved devices according to the invention of FIGS. 2 to 5.

FIG. 2 illustrates a device improved according to the invention which takes as basis the device shown in FIG. 1, modified, solely for purposes of simplification and in order to facilitate comparison of the trajectories of the third pin A3, as will be shown further on in FIG. 6.

In FIG. 2, the device has no tilt stop for front section 4 or rear section 5 and has temporary means of support 17 and 19, in particular for the rear end of the jack 10 on subframe 3. These means of support consist, for example, of a wheel 17, advantageously connected to subframe 3. Wheel 17 and running surface 19 are able to cooperate by running. This example of a method of execution of the means of support, as well as other possible means, are described in greater detail with the assistance of FIGS. 8 to 13.

Figure 3:
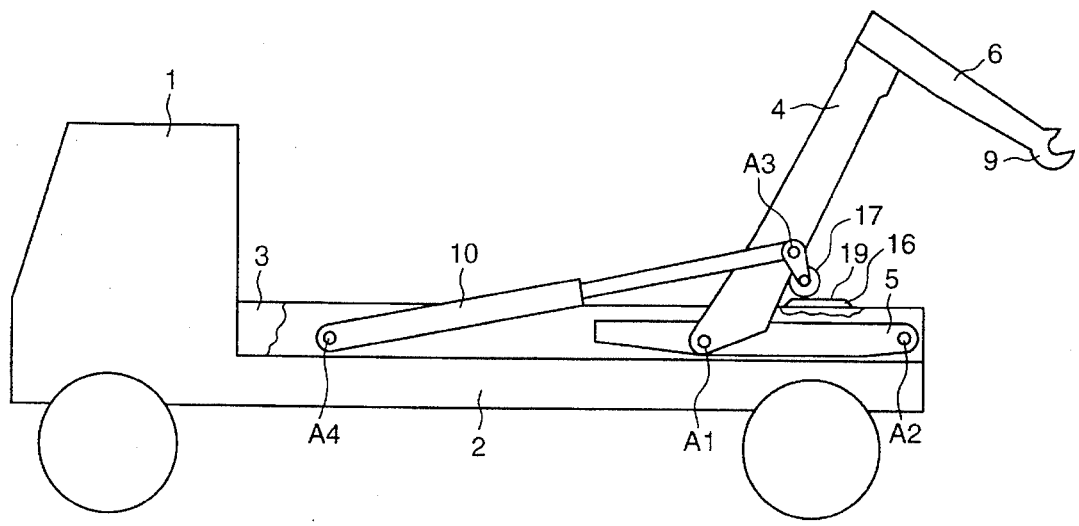
FIG. 3 represents in profile the device improved according to the invention in FIG. 2, in particular in the unloading position at the moment when the means of support come into action.
Figure 4:
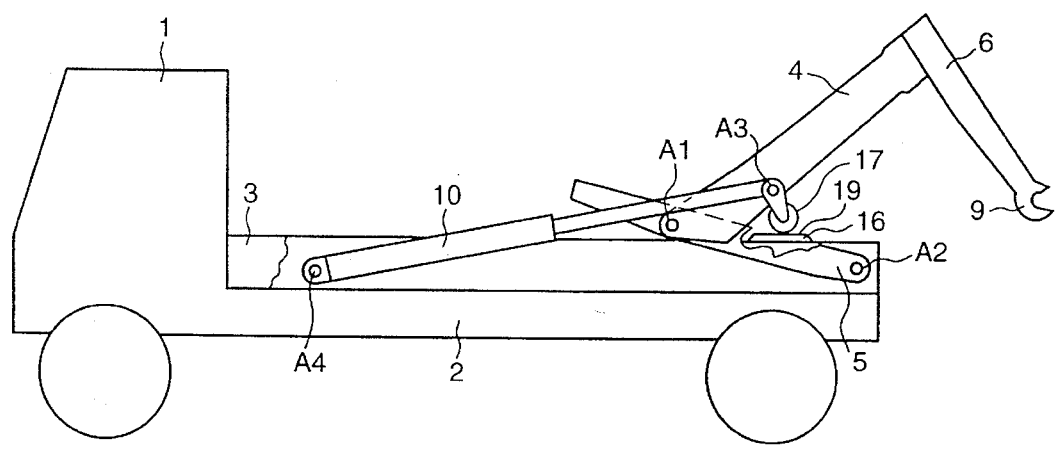
FIG. 4 represents in profile the device improved according to the invention in FIG. 2, in particular at the end of unloading.

The operation of the first example of a device improved according to the invention is now described with the assistance of FIGS. 2, 3 and 4.

FIG. 2 represents the device, jack 10 being retracted, in particular ready for unloading.

During an unloading manoeuvre, jack 10 is activated, initially causing the rotation of front section 4 round first pin A1, until wheel 17 comes into support on running surface 19, according to a position which is represented by FIG. 3. this supporting of the rear end of the jack on subframe 3 makes it possible to establish a force of reaction of the latter, advantageously opposed to the weight of the load, when the lever arm in relation to pin A1 reduces considerably and thus makes it possible to reduce the thrust exerted by the jack as front the moment when the support takes place.

Under a continuous thrust from jack 10, rear section 5 primes a rotation around the second pin A2, the wheel 17 travelling supported on the running surface 19, until unloading is complete, position represented by FIG. 4 (load not represented).

It will be noted that this example of method of execution of a device according to the invention, means of support 17, 19 act throughout the movement of the rear section.

The loading manoeuvre takes place in the reverse order of the movements described for the unloading manoeuvre.

Figure 5:
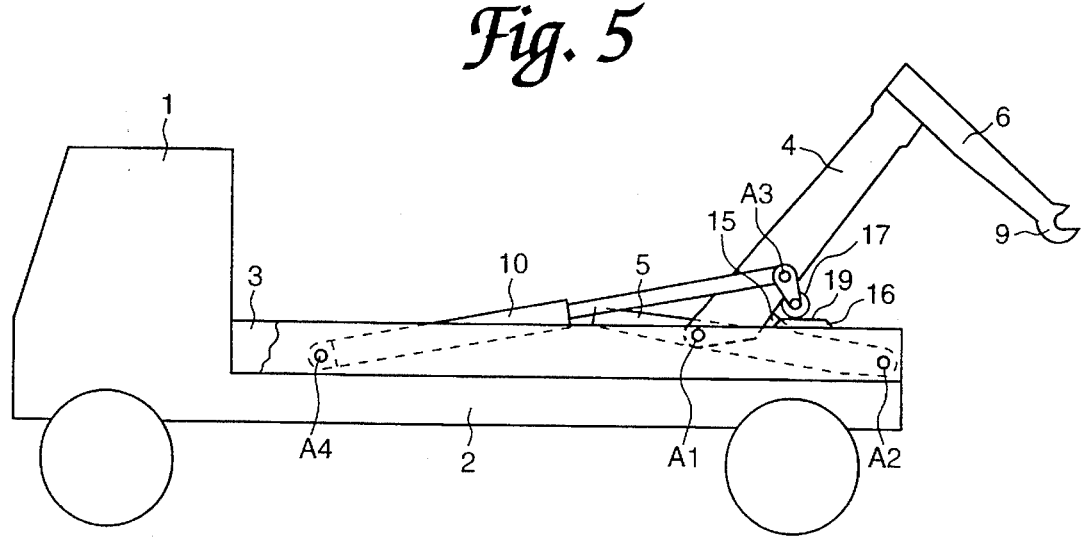
FIG. 5 represents in profile a second example of method of execution of a device improved according to the invention, consisting of a thrust of movement of the front section on the rear section.

FIG. 5 represents the device improved according to the invention in FIG. 2, consisting of a stop 15 of movement of front section 4 on the rear section 5. The device is represented in the stop position of the front section of the rear section. It will be noted that the device in this figure only repeats that of FIG. 2 modified in order to assist with comparison of the trajectories of the third pin A3, and the thrusts exercised by the jack, as will be shown further on in FIGS. 6 and 7.

In an unloading manoeuvre with the device represented in FIG. 5, the movements are similar to those of the device described with the assistance of FIGS. 2 and 3. From the supporting of the wheel 17 on running surface 19, under the continuous thrust of the jack, rear sections 5 primes a rotation around the second pin A2, until front section 4 becomes supported on rear section 5 through the intermediary of stop 15, a position shown in FIG. 5. At this moment, the thrust of the jack maintains rear section 5 in rotation around the second pin A2 and the front section 4 stopped on the latter, wheel 17 no longer being supported on running surface 19 until the end of unloading.

It will be noted that the means of support only act in this case during part of the movement of the rear section 5.

FIG. 6 shows in profile the compared diagrams of the trajectories of the third pin A3 for the device in FIG. 1 and for the devices improved according to the invention in FIGS. 2 to 5.

Curve M'-M"-M'" illustrates the trajectory of the third hinge pin A3 of the device represented on FIG. 1.

Curve M'-Y-X illustrates the trajectory of the third hinge pin A3 of the device represented in FIGS. 2 to 4, point M' corresponding to the position of the device represented in FIG. 2, point Y corresponding to the position of the device represented in FIG. 3, point X corresponding to the position of the device represented in FIG. 4.

Curve M'-Y-X-M'" illustrates the trajectory of the third hinge pin A3 of the device in FIG. 5, the part of trajectory X-M'" corresponding to the movement of the front section 4 stopped on the rear section 5.

In all cases, the part of trajectory Y-X is defined by the means of support, more especially by the running surface 19. It will be noted for this purpose that the running surface 19 can take any appropriate form required, in particular for an advantageously tangential connection of trajectories M'-Y and Y-X and trajectories Y-X and X-M'" if necessary.

Figure 7:
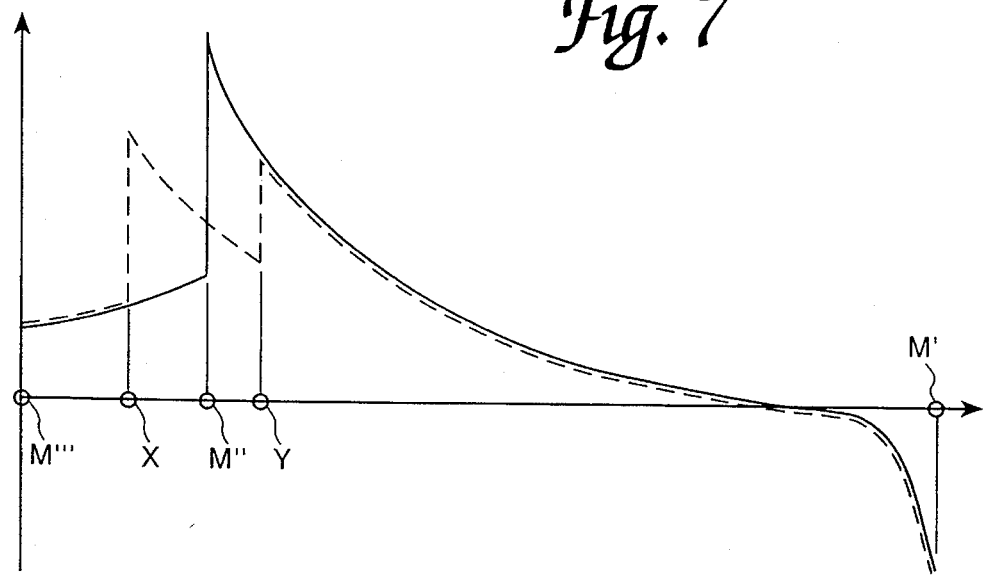
FIG. 7 represents the compared diagrams of the thrust exercised by the jack for the device in FIG. 1 and for the improved devices according to the invention in FIGS. 2 to 5.

The x axis in FIG. 7 corresponds to the travel of jack 10 and the y axis corresponds to the thrusts supplied by the jack. The solid line curve represents diagrammatically the thrust/travel function of the jack of the device in FIG. 1, and the curve in dotted lines represents schematically the thrust/travel function of the jack of the device in FIG. 5. On the x axis, the points of the travel of the jack are represented marked on the trajectories of FIG. 6.

In the case of the device according to the invention represented in FIGS. 2 to 4, the dotted curve in FIG. 5 remains valid in its portion X-Y-M'.

It will be noted in FIG. 7 that the devices according to the invention make it possible to reduce the maximum thrust which the jack should supply considerably, this being located during the trajectory Y-M" of the device in FIG. 1, advantageously by means of temporary means of support 17 and 19.

It should be noted that the curves in FIGS. 6 and 7 are not scale and have only been shown for better understanding of the action of the temporary means of support.

FIGS. 8 to 13 represent various examples of the means of providing temporary means of support. These methods of preferential execution are obviously only given as an example, all known means of support making it similar to guarantee a temporary force of reaction of the sub-frame 3 directly or indirectly on jack 10 remaining valid.

Figure 8:
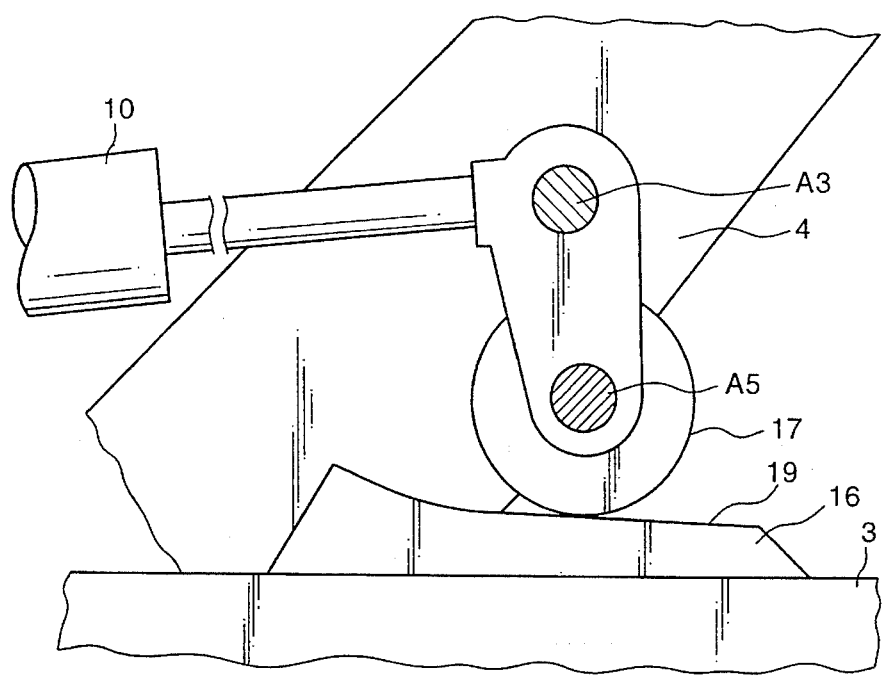
FIG. 8 represents in profile a first example of the method of execution of the means of support.

FIG. 8 illustrates a wheel 17 travelling on a running surface 19. Running surface 19 is shown in a direction parallel to the direction of extension of jack 10 and is advantageously supported by a ramp 16 fixed rigidly to sub-frame 3 by any known means, for example by welding. It is to be noted that running surface 19 may be formed directly by part of the subframe, if required. As has already been stated above, the running surface 19 can take any form advantageous to the connection of the trajectories or even the trajectory of front section 4, or again to the thrust/travel of jack 10 curve.

Figure 9:
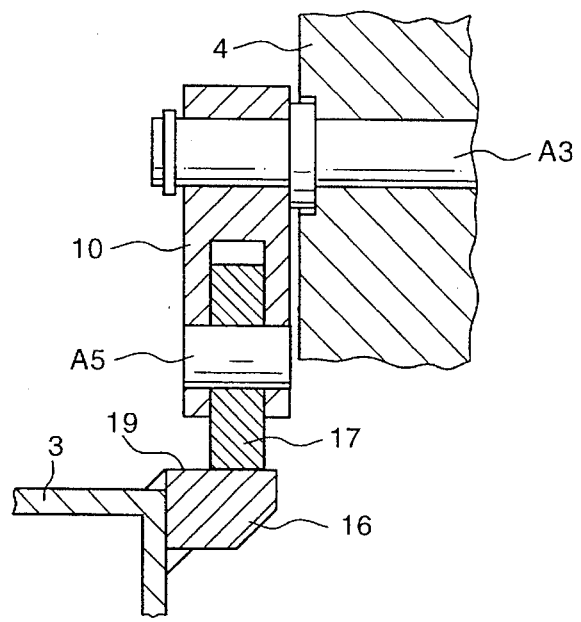
FIG. 9 represents in cross-section FIG. 8.

Wheel 17 is advantageously mounted over the rear end of jack 10, and in free rotation around a fifth pin A5 advantageously linked rigidly to the wheel or to the end of the jack, as represented by FIG. 9 in cross section. The connection of the fifth pin A5 can be provided by any known means such as, for example, by forced joint, pin or similar. It is clear that wheel 17 can be fitted on the bearing (not represented) around fifth pin A5, if wished, or be replaced by a bearing (not represented) directly supported on running surface 19.

Figure 10:
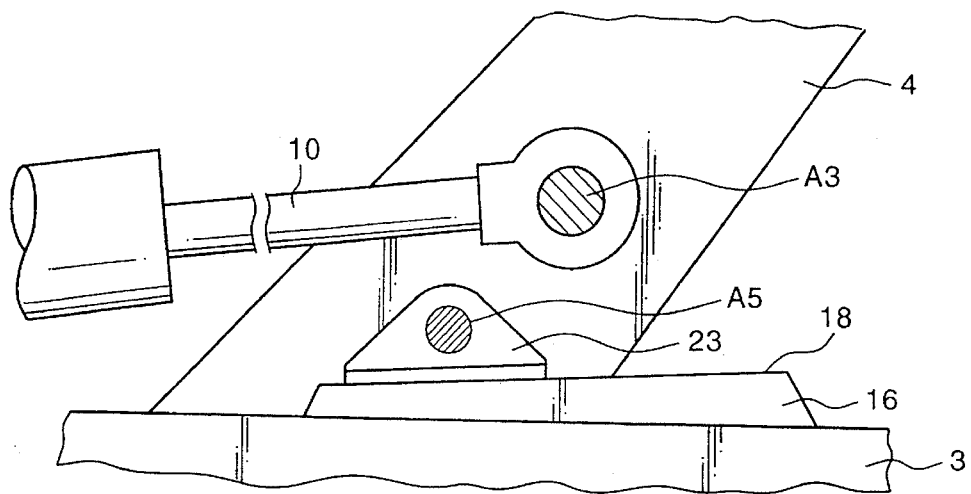
FIG. 10 represents in profile a second example of the method of execution of the means of support.

FIG. 10 illustrates a block 23 sliding surface 18. Block 23 is advantageously in free rotation around a fifth pin A5 linked to the front section 4 by any known means.

Figure 11:
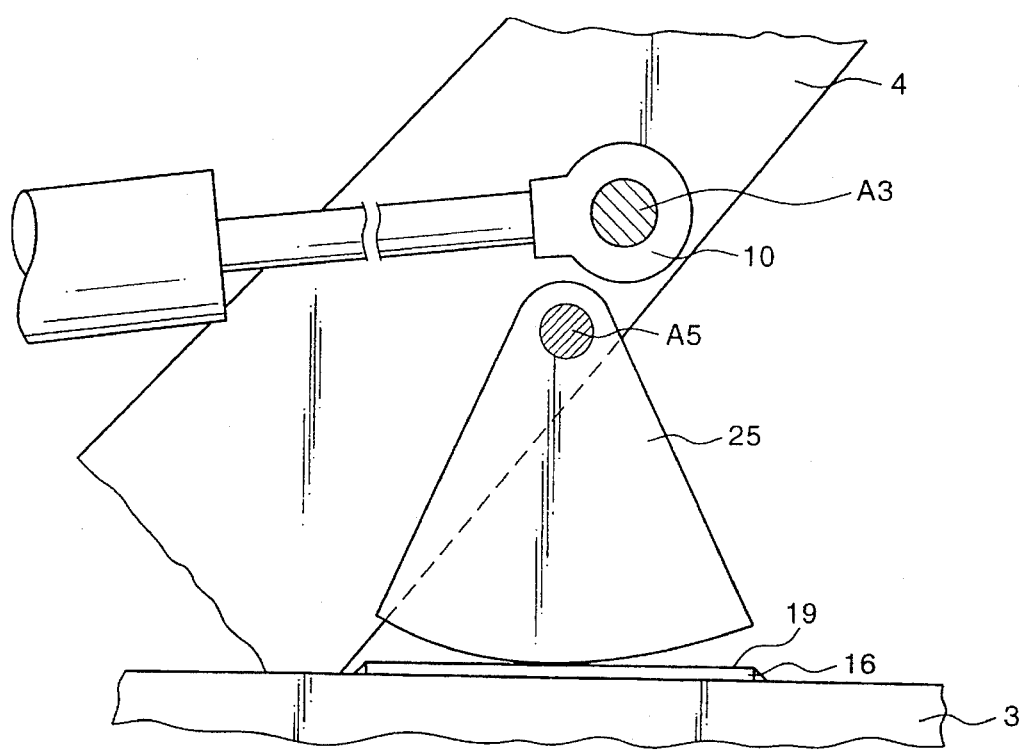
FIG. 11 represents in profile a third example of the method of execution of the means of support.

FIG. 11 illustrates a sector 25 in free rotation around a fifth pin A5 linked to the front section according to any known means. Sector 25 runs on running surface 19.

Figure 12:
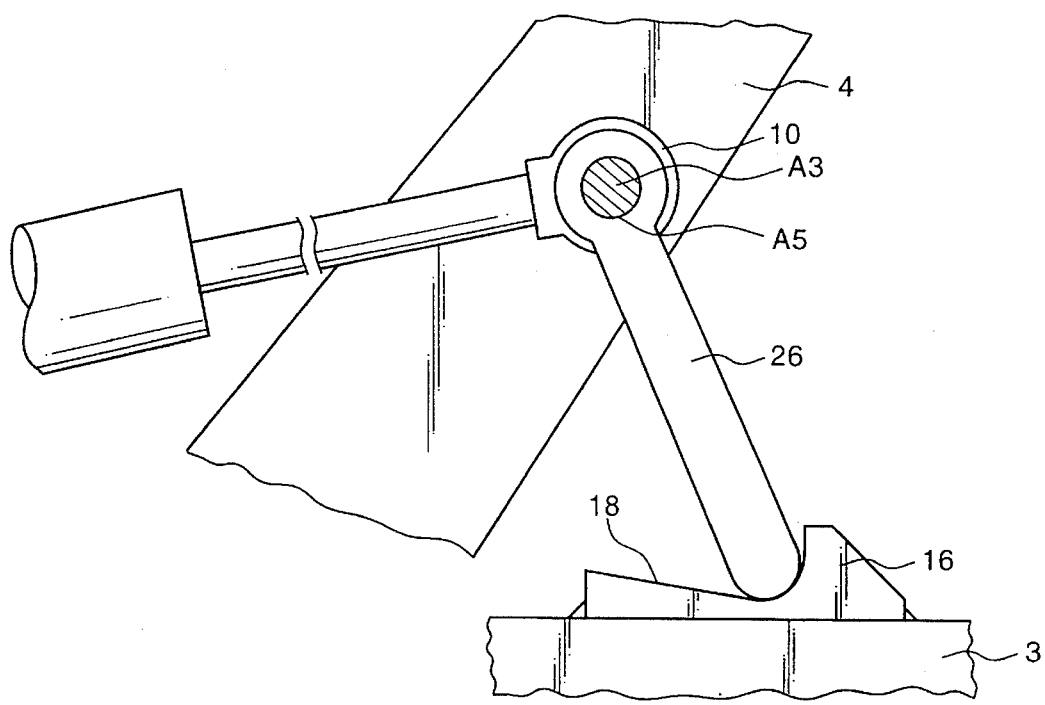
FIG. 12 represents in profile a fourth example of the method of execution of the means of support.

FIG. 12 illustrates a prop 26 supported on a sliding surfaces 18. The prop is advantageously in free rotation around a fifth pin A5 advantageously set with the third pin A3. The sliding surface has a prop wedge stop, in order to prevent its skidding and guarantee the temporary reaction force.

Figure 13:
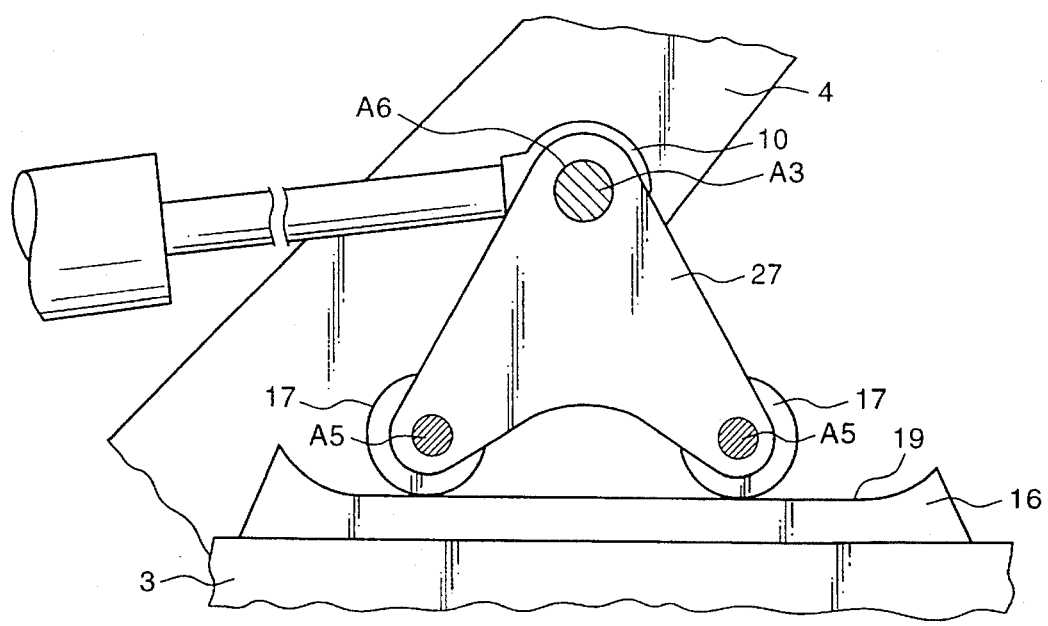
FIG. 13 represents in profile a fifth example of the method of execution of the means of support.

FIG. 13 illustrates a flange 27, in free rotation around a sixth pin A6 advantageously set with the third pin A3 and bearing two wheels 17 each in free rotation on the flange around a fifth pin A5. This configuration in particular makes it possible to distribute the force of reaction of the sub-frame 3 in two points of application and to control the result obtained. The erection of each of wheels 17 on flange 27 can, for example, be carried out in a manner similar to the erection of wheel 17 in FIG. 8. The erection of flange 27 on pin A3 is carried out in any known manner, for example by erection of the hinged cap type.

It should be noted that the comments made with regard to support surface 19 and ramp 16 with the assistance of FIG. 8 and 9 are also applicable to support surfaces 18, 19 and ramps 16 in FIGS. 10, 11, 12 and 13.

We claim:

1. A device for handling loads from a vehicle, designed to be fitted on a carrying platform of said vehicle, comprising:

one lower hinged arm including one front section hinged on a rear section by a first hinge pin, said first hinge pin being situated at a first end of said front section, said rear section being hinged by a second hinge pin on said platform, one upper arm linked at a lower end to a second end of said front section, and having at an upper end a means of gripping loads, at least one jack for allowing a tilting movement of said front section around said first hinge pin, a rear end of said jack being linked to said front section around a third hinge pin, its front end being linked to platform around a fourth hinge pin, said third hinge pin being positioned between said first hinge pin and said second end of said front section, said third hinge pin for forming a circular trajectory during said tilting movement of said front section around said first hinge pin, and temporary supporting means for supporting said rear end of said jack, said temporary supporting means comprising a first part integral with said platform, and a second part integral with said front section or with said rear end of the jack or with said third hinge pin, said first part for establishing a temporary force of reaction against said second part during said tilting movement of said front section around said first hinge pin, said second part being positioned between said first hinge pin and said second end of said front section, said first part or said second part including a support surface fit for partially modifying said circular trajectory of said third hinge pin.

2. Device according to claim 1, further comprises stopping means for establishing a stop of said front section on said rear section during said tilting movement of said front section around said first hinge pin.

3. Device according to claim 1, wherein said temporary supporting means further comprises at least one wheel or bearing in free rotation around a fifth hinge pin, said wheel being temporarily supported on said support surface.

4. Device according to claim 1, wherein said temporary supporting means further comprises at least one block, said block being temporarily supported on said support surface.

5. Device according to claim 4, wherein said block is hinged around a fifth hinge pin.

6. Device according to claim 1, wherein said temporary supporting means further comprises at least one prop in free rotation around a fifth hinge pin, said prop being temporarily supported on said support surface.

7. Device according to claim 1, wherein said temporary supporting means further comprises at least one sector in free rotation around a fifth hinge pin, said sector being temporarily supported on said support surface.

8. A device for handling loads from a vehicle, designed to be fitted on a carrying platform of said vehicle, comprising:

one lower hinged arm including one front section hinged on a rear section by a first hinge pin, said first hinge pin being situated at a first end of said front section, said rear section being hinged by a second hinge pin on said platform, one upper arm linked at a lower end to a second end of said front section, and having at an upper end a means of gripping loads, at least one jack for allowing a tilting movement of said front section around said first hinge pin, a rear end of said jack being linked to said front section around a third hinge pin, its front end being linked to said platform around a fourth hinge pin, said third hinge pin being positioned between said first hinge pin and said second end of said front section, said third hinge pin for forming a circular trajectory during said tilting movement of said front section around said first hinge pin, and temporary supporting means for supporting said rear end of said jack, said temporary supporting means comprising a first part integral with said platform, second part integral with said front section or with said rear end of the jack or with said third hinge pin, and at least one wheel or bearing in free rotation around a fifth hinge pin, said wheel or bearing being temporarily supported on said support surface, whereby said first part for establishing a temporary force of reaction against said second part during said tilting movement of said front section around said first hinge pin, said second part being positioned between said first hinge pin and said second end of said front section, said first part or said second part including a support surface fit for partially modifying said circular trajectory of said third hinge pin, wherein said fifth hinge pin and said third hinge pin are set together.

9. A device for handling loads from a vehicle, designed to be fitted on a carrying platform of said vehicle, comprising:

one lower hinged arm including one front section hinged on a rear section by a first hinge pin, said first hinge pin being situated at a first end of said front section, said rear section being hinged by a second hinge pin on said platform, one upper arm linked at a lower end to a second end of said front section, and having at an upper end a means of gripping loads, at least one jack for allowing a tilting movement of said front section around said first hinge pin, a rear end of said jack being linked to said front section around a third hinge pin, its front end being linked to said platform around a fourth hinge pin, said third hinge pin being positioned between said first hinge pin and said second end of said front section, said third hinge pin for forming a circular trajectory during said tilting movement of said front section around said first hinge pin, and temporary supporting means for supporting said rear end of said jack, said temporary supporting means comprising a first part integral with said platform, a second part integral with said front section or with said rear end of the jack or with said third hinge pin, and at least one wheel or bearing in free rotation around a fifth hinge pin, said wheel or bearing being temporarily supported on said support surface, whereby said first part for establishing a temporary force of reaction against said second part during said tilting movement of said front section around said first hinge pin, said second part being positioned between said first hinge pin and said second end of said front section, said first part or said second part including a support surface fit for partially modifying said circular trajectory of said third hinge pin, wherein said fifth hinge pin is carried by a flange, said flange being hinged around a sixth hinge pin.

10. Device according to claim 9, wherein said sixth hinge pin and said third hinge pin are set together.

* * * * *